United States Patent [19]
Schoffmann

[11] 3,830,449
[45] Aug. 20, 1974

[54] AIRFOIL WING FOR AIRCRAFT

[76] Inventor: Friedrich Schoffmann, 86 Vorgartenstrasse, A-1200 Vienna, Austria

[22] Filed: July 14, 1972

[21] Appl. No.: 271,645

[52] U.S. Cl. ............. 244/35 R, 244/11, 244/64
[51] Int. Cl. ............................... B64c 33/02
[58] Field of Search ........... 244/22, 35 R, 72, 123, 244/16, 49, 64

[56] References Cited
UNITED STATES PATENTS

| | | | |
|---|---|---|---|
| 844,771 | 2/1907 | Bellows | 244/22 |
| 1,033,646 | 7/1912 | Wilson | 244/64 |
| 1,036,033 | 8/1912 | Twining | 244/64 |
| 1,376,584 | 5/1921 | Rilleau | 244/22 |
| 1,485,163 | 2/1924 | Braun | 244/49 |

*Primary Examiner*—Duane A. Reger
*Assistant Examiner*—Jesus D. Sotelo
*Attorney, Agent, or Firm*—Imirie and Smiley

[57] ABSTRACT

An airfoil wing having a generally triangular support frame extending transversely from an aircraft fuselage and upon which are mounted a plurality of overlapping, curved, elongated blades extending rearwardly of the frame such that the blades together with the frame define an aerodynamic structure characterized by a flat, generally vertical leading edge contiguous with a convex upper surface and a concave lower surface, the forward portion of each of the upper and lower surfaces forming an acute angle with respect to the plane of the leading edge whereby flapping movement of the wing creates lift and forward propulsion by establishing reduced pressure above and in front of the wing and increased pressure below the same to generate lift and forward thrust with minimal energy.

5 Claims, 5 Drawing Figures

PATENTED AUG 20 1974

AIRFOIL WING FOR AIRCRAFT

BACKGROUND OF THE INVENTION

The present invention relates generally to aircraft wings and, more particularly, to an airfoil wing which in its initial position with zero angle of attack has upwardly curved top and bottom surfaces.

SUMMARY OF THE INVENTION

The present invention is summarized in that an airfoil wing, particularly for ornithopters, has top and bottom surfaces which in the free stream direction include an acute-angled edge. In the initial position of the wing with zero angle of attack, the leading edge of the wing is disposed in a substantially vertical plane which is tangent to the front portion of the top surface of the wing.

A specially designed wing section is required to enable unrestricted, prolonged motorless flights which are independent of useful rising air currents.

The invention provides an airfoil wing, which may be used as a flapping wing and which has top and bottom surfaces having different curvatures and forming in the free stream direction a vertical, acute-angled edge. In the initial position of the wing, with zero angle of attack, the leading edge of the wing is included in a substantially vertical plane which is tangent to the top surface of the wing. By the resulting flat wing nose, the air approaching from in front and also the air approaching from below are divided each into two currents, which are highly different in velocity and mode of action and are compelled to perform useful work. This is so because when the flapping wing is moving downwardly and when the wing is stationary the air rushing into the lower curvature of the wing section is compressed to form an air cushion, which has a higher carrying capacity and increases the lift, whereas the air flowing over the strongly curved top surfaces applies pressure to the trailing portion of the wing and results in propulsion.

When the wing is moving upwardly, the air from the top surface flows downwardly over the strongly curved section nose with an acceleration so as to produce a subatmospheric pressure so that the resistance is reduced and the existing lift raises the wing more strongly. The air which continues to flow moves in the opposite direction around the sharp vertical leading edge into the range of action of the suction pressure which exists on the underside and produces a lift, which by said air is much increased.

At its end near the fuselage, the spar of the wing is triangular. One side of the triangle forms the leading edge. The remaining two sides of the triangle constitute supports for a set of thin, elongated blades or feathers, which may be artificial and consist, e.g., of foamed plastics material and define the top and bottom surfaces of the wing. The blades are resilient to ensure that the wing is elastic. The triangular configuration of the spar at the junction between the wing and the fuselage ensures the required stability.

The plane which includes the triangular crosssection of the spar is inclined at an angle of 40°-60°, preferably of 45°, from the horizontal.

An embodiment of the airfoil wing according to the invention is shown by way of example on the drawing, in which FIG. 1 is a perspective view showing the wing. To render the internal structure more clearly visible, the upper and lower fairings are only schematically indicated.

Figure 5:
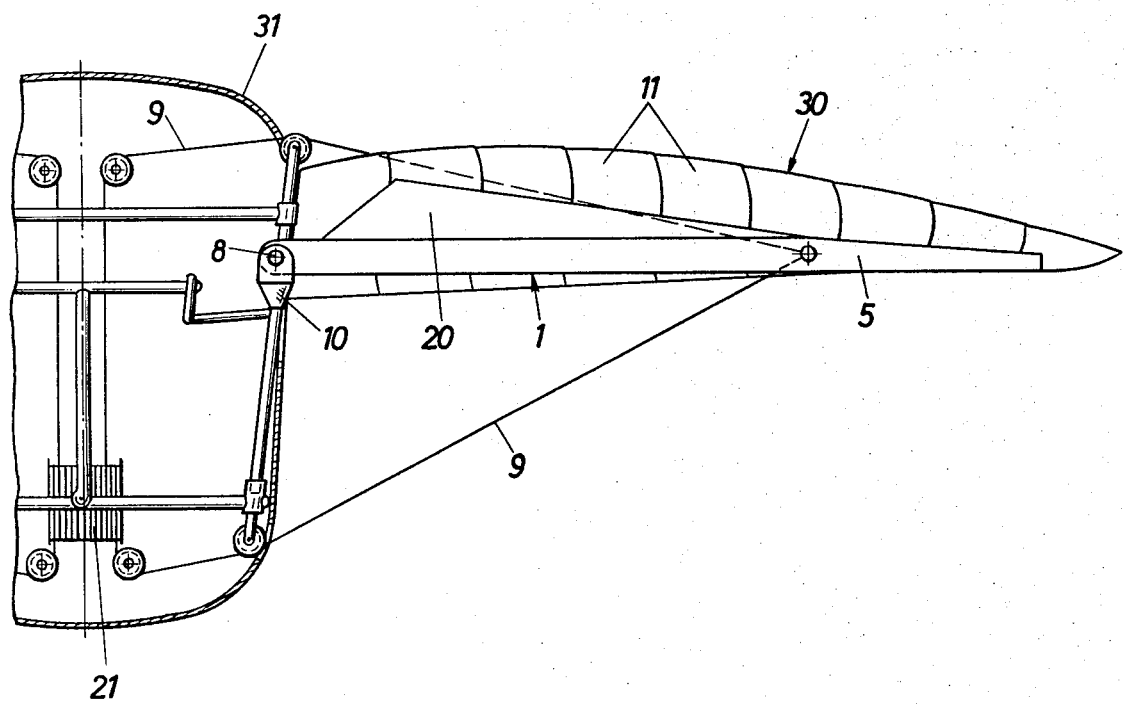
FIG. 5 is a front elevational view of the airfoil wing of FIG. 1 together with an aircraft fuselage shown partially in section.

The illustrated embodiment of the airfoil wing according to the invention is intended for use as a flapping wing. The wing 30 comprises a supporting element consisting of a spar 1, which when the wing is in position for use extends transversely of the fuselage 31 of the aircraft, as shown in FIG. 5 and has the configuration of a triangle. The spar consists essentially of beams 2, 3, and 4. The beam 2 consists of a bar 5, which adjoins the fuselage 31 of the aircraft, a bar 6, which extends at an acute angle to the bar 5 substantially as far as to the beam 4, and a portion 7 which adjoins the beam 3 and is provided with a pivot 8. As is indicated by a double arrow A, the spar 1 can be pivotally moved by a rope drive 9. The pivot 8 is mounted in a fork 10 rotatably secured to a suitable support frame mounted at the side of the fuselage 31 as illustrated in FIG. 5. Fork 10 enables pivotal movement of the wing in the direction of the double arrow B imparted by a mechanism (not shown) similar to rope drive 9 and operated by the pilot. This arrangement enables a movement of the wing in any desired direction, depending on the desired direction of flight. As will be described more fully below, wing 30 is formed of a plurality of thin, resilient blades or feather-like members extending from spar 1 in an overlapping array. Thus, any pressure or contact between the wing and fuselage is accommodated by the flexure of the blades adjacent the fuselage to preclude damage as the wings are pivoted vertically or horizontally. Further, fuselage contact caused by rotation of fork 10 is minimum as the same is limited in practice to about 23° or less in both directions from a central position.

Figure 1:
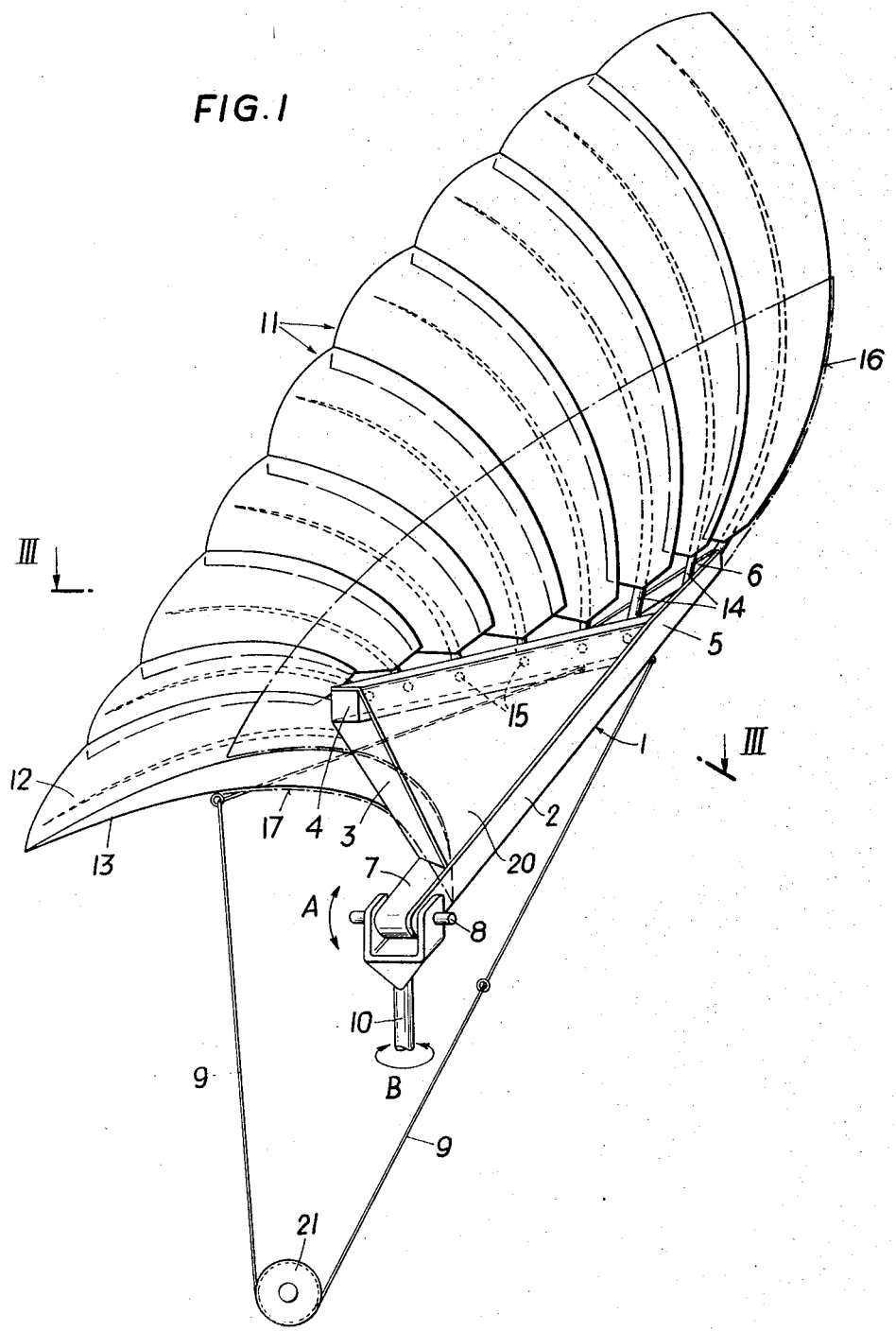
Figure 2:
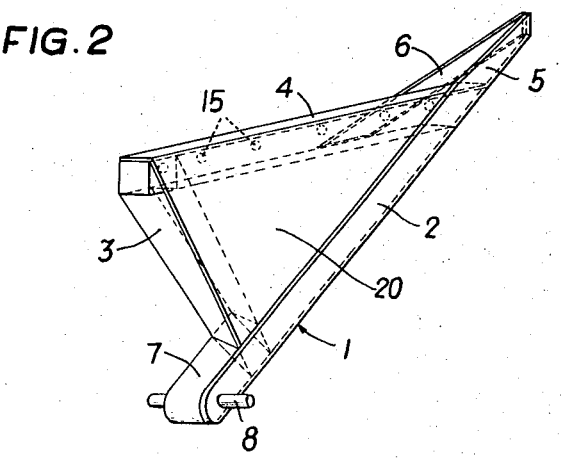
FIG. 2 is a perspective view showing the spar which forms the supporting element of the wing.
Figure 3:
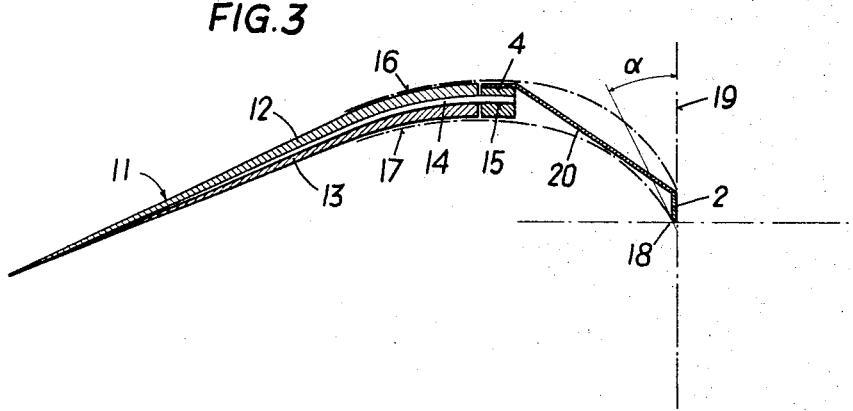
FIG. 3 is a transverse sectional view taken approximately on plane III—III in FIG. 1 through the leading portion of the spar.
Figure 4:
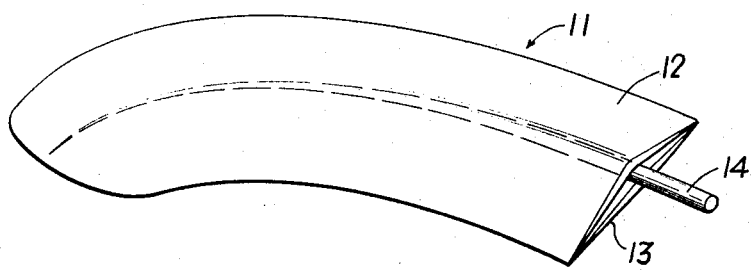
FIG. 4 is a perspective view showing one of the feathers or blades which in part define the shape of the wing.

The body of the wing consists of blades or feathers 11, which are provided in any desired number, in the present case nine, and arranged in succession with overlapping edges. One such feather is shown in FIG. 4. The top and bottom walls 12 and 13, respectively, of the feathers 11 consist of particularly tough, elastic, thin and very light slabs of foamed plastics material. With a woven fabric layer interposed, each feather is adhered by means of an adhesive particularly suitable for this purpose approximately along the first one-third of the length of the spring to a stem 14, with which the feathers 11 are fixed in transverse bores 15 of the beam 4 of the spar 1, as is apparent from FIGS. 1 and 3. It will be understood that any other joint between the stem 14 and the beam 4 may be provided. For instance, the stem 14 of each feather 11 may be secured, e.g., with threaded fasteners, to the top surface or to a different portion of the beam 4. As is apparent from FIG. 1, the terminal feathers may be secured to the beam 2 of the spar 1. The feathers 11 form a fanlike array, in which the leading edge of the second feather and every subsequent feather, counted from the pivot 8, lies on the trailing edge portion of the preceding feather. In this arrangement, the feathers are automatically held in a horizontal attitude by the action of air pressure from below. As is indicated in dash-dot lines in FIGS. 1 and 3, a fairing consisting, e.g., of strong, thin plastics material is provided on the top and bottom surfaces 16 and 17, respectively, approximately in a length of one-third to one-half of the length of the feathers 11 from that end where the stems protrude.

As a main feature of the invention, the shape and arrangement of the feathers and the configuration of the fairing on the surfaces 16, 17 and the shape of the spar are selected so that the wing has an upward curvature on its top and bottom surfaces and the bottom surface is less strongly curved than the top surface. This is particularly apparent from FIG. 3. Another important feature of the invention resides in the fact that the forward portions of the top and bottom surfaces of the wing are disposed at an acute angle with respect to vertical and are contiguous with a flat leading edge 18, as is apparent from FIG. 3. It is particularly significant that when the wing is in its initial position shown, a plane 19 which is tangential to the top surface of the wing along edge 18 is substantially vertical and at right angles to the pivot 8 of the wing. The leading edge 18 extends along the beam 2 of the spar 1. In this manner, and as noted above, the wing structure of the present invention provides enhanced lift and propulsion by advantageously utilizing aerodynamic forces caused by the splitting of the airflow by the flat leading edge 18 and the directing of such split air streams over and under the highly curved assymetrical wing configuration.

The beams 3 and 4 of the spar 1 are preferably rectangular in cross-section and may consist of tubes of metal or plastics material.

The wing section is asymmetrical. The section is strongly curved in the leading one-third part and rearwardly merges gently into the top surface of the feather 11. For stiffening, the beams 2, 3, 4 of the spar 1 may be connected by a rigid cover plate 20 at the end adjacent to the fuselage of the aircraft, not shown.

In the embodiment shown by way of example, where the wing consists of a flapping wing, the same can be operated by the pilot who by his legs operates pedals to drive a drum 21, by which the rope drive 9 is alternately operated in one direction and the other.

The triangle occupies approximately one-half of the length and one-third of the width of the length of the flapping wing. Except for its portion adjacent to the triangle, the wing is elastic.

For a prolonged sailing flight, the flapping wing may be fixed in a manner which is not shown, e.g., in that the pilot applies his weight to the drive pedals or in that the rotation of the shaft or pivot 8 is prevented by means of a wedge or a locking brake. Due to the leading edge 18, the effects produced by the wing when fixed are the same as those produced by a moving wing. Where known wing sections are used, which are substantially symmetrical and streamlined and have a rounded, horizontal leading edge, over which the air flows without utilization, a prolonged sailing flight is enabled only by rising air currents. With the wing section embodying the invention, a lift is continuously produced at the wing by the air currents which are enforced and accelerated.

Those surfaces of the wing which are disposed outside the triangular spar are defined and have elasticity imparted thereto by the feathers 11, which overlap as in a fan and which have a load-carrying central element or stem 14, which consists of natural reed or of a tube of metal or plastics material and which is bent in conformity with the direction of the feathers and towards its rear end is strongly tapered to a point in a square configuration. The surfaces of the feathers are formed by particularly tough, elastic, thin and very light slabs of foamed plastics material and in the first one-third of their length are adhered to the stem by a special adhesive and with a woven fabric strip interposed. These feathers are caused to overlap as in a fan in such a manner that the leading edge of each feather lies on the rear edge portion of the preceding feather so that the feathers are automatically held in a horizontal orientation under the action of air pressure from below. These light-weight artificial feathers 11 provide a high stability and elasticity and a thin section, which is highly favorable from an aerodynamic aspect. After each raising or lowering of the wing, its end performs an elastic waving motion so that a formation of braking vortices in the air is prevented.

The wing is arranged to be operated by muscle power, which is transmitted in known manner by pedals, ropes and rope drums to the flapping wings.

The propulsion may be assisted during the start by a natural or artificial inclined plane, or the aircraft may be catapulted by means of a rubber rope.

It will be understood that the wing according to the invention may also be used with powered aircraft.

What is claimed is:

1. An airfoil wing for aircraft, particularly for ornithopters, said wing having an elongated shape, a convex curved top surface and a concave curved bottom surface, the curvature of the forward portions of said top and bottom surfaces being upwardly directed when the wing is in its initial position with a zero angle of attack, said top surface of the wing including a substantially vertical forward portion merging with said bottom surface to define an acute angle therebetween, said vertical portion of said top surface providing a flat leading edge which, together with said top and bottom surfaces, creates enhanced lift and propulsion during flight, and a spar adjacent to said vertical portion of said top surface and consisting of three beams, which form a triangle, one of said beams extending along said vertical portion of said top surface, and another beam carrying a plurality of rearwardly extending elongated blades arranged as in a fan and having overlapping edges to form said top and bottom surfaces of the wing.

2. A wing as set forth in claim 1, wherein the triangle defined by the beams of said spar lies in a plane having an inclination of 40°–60° from the horizontal when the wing is in its initial position with a zero angle of attack.

3. A wing as set forth in claim 1, wherein said beams of said spar are interconnected by a common rigid cover plate.

4. The wing as set forth in claim 1, wherein said blades are resilient.

5. An airfoil wing for aircraft comprising:
a generally triangular support spar having a connecting arm extending from an apex of said spar for pivotal connection with an aircraft fuselage so as to enable movement of said spar about an axis generally parallel to the longitudinal direction of said fuselage, said spar disposed in a plane forming an angle with respect to horizontal of about 40°–60° and having a flat, generally vertical forward edge, a plurality of curved, elongated, resilient blades extending rearwardly from said spar, said blades disposed adjacent each other such that the edges thereof overlap, and fairing means covering said spar and a portion of said blades to form a contiguous convex upper surface and a contiguous concave lower surface, said surfaces extending from upper and lower edges, respectively, of said flat leading edge of said spar at an acute angle with respect to a vertical axis.

* * * * *